United States Patent
Ewens et al.

(10) Patent No.: US 8,516,829 B2
(45) Date of Patent: Aug. 27, 2013

(54) SYSTEMS AND METHODS FOR MODIFYING THE PERFORMANCE OF A GAS TURBINE

(75) Inventors: David Ewens, Greer, SC (US); Kevin Wilkes, Greenville, SC (US); Christopher Long, Greer, SC (US); Noemie Dion Ouellet, Greenville, SC (US)

(73) Assignee: General Electric Company, Schenectady, NY (US)

( * ) Notice: Subject to any disclaimer, the term of this patent is extended or adjusted under 35 U.S.C. 154(b) by 1110 days.

(21) Appl. No.: 12/472,927

(22) Filed: May 27, 2009

(65) Prior Publication Data
US 2010/0300062 A1   Dec. 2, 2010

(51) Int. Cl.
*F02C 9/28* (2006.01)
(52) U.S. Cl.
USPC .............. 60/793; 60/39.24; 60/803; 702/130; 702/136; 374/43; 374/44; 73/112.01
(58) Field of Classification Search
USPC ........ 60/772, 773, 793, 39.24, 803; 702/130, 702/136; 374/4, 29, 43, 44, 45, 57, 141, 374/152, 153
See application file for complete search history.

(56) References Cited

U.S. PATENT DOCUMENTS

| | | | |
|---|---|---|---|
| 5,226,731 A * | 7/1993 | Allen | 374/124 |
| 5,857,321 A | 1/1999 | Rajamani et al. | |
| 6,715,277 B2 * | 4/2004 | Zagranski et al. | 60/39.281 |
| 6,805,483 B2 | 10/2004 | Tomlinson et al. | |
| 2007/0033944 A1 | 2/2007 | Rowe et al. | |
| 2007/0157620 A1 * | 7/2007 | Healy et al. | 60/772 |
| 2009/0288416 A1 * | 11/2009 | Matsumoto et al. | 60/646 |

* cited by examiner

*Primary Examiner* — William H Rodriguez
*Assistant Examiner* — Steven Sutherland
(74) *Attorney, Agent, or Firm* — Sutherland Asbill & Brennan LLP

(57) ABSTRACT

Embodiments of the invention can provide systems and methods for modifying the operation and/or performance of a gas turbine. According to one embodiment, a method for modifying the performance of a gas turbine comprising one or more combustors can be provided. The method can include measuring a gas exhaust temperature for the gas turbine and estimating a heat transfer rate for the gas turbine based at least in part on the gas exhaust temperature. After estimating the heat transfer rate, the method can continue by estimating a transiently accurate combustion reference temperature and using this parameter to control the one or more combustors of the gas turbine. In doing so, the performance of the gas turbine can be modified to ensure reliable and consistent operation.

15 Claims, 5 Drawing Sheets

SYSTEMS AND METHODS FOR MODIFYING THE PERFORMANCE OF A GAS TURBINE

FIELD OF THE INVENTION

The invention relates to a gas turbine, and more specifically, to systems and methods for modifying the operation and/or performance of a gas turbine.

BACKGROUND OF THE INVENTION

Gas turbines operate at high temperatures, especially where the combustion system discharges into the inlet of the turbine section. Although satisfactory instrumentation has not been developed to reliably measure the gas temperature in the combustor discharge duct or turbine inlet section, these temperatures can be estimated using turbine parameters that can be reliably measured or determined. Thus, by using measurable or determinable turbine parameters, a control system can be employed to schedule one or more combustion fuel supply circuits.

One such parameter that can be determined, but not directly measured, and used to control the combustion fuel supply circuits is the combustion reference temperature ("CRT"). The CRT is related to the gas temperature at the discharge of the combustor. The CRT can be an important control measure for optimum control of the combustion fuel supply circuits. An accurate determination of the CRT can ensure reliable operation of the gas turbine through proper fuel control and can effectively control NOx and CO emissions in the turbine exhaust gas.

Because the CRT can not be reliably measured during normal operation using conventional systems and methods, gas turbine control systems typically estimate the CRT according to an empirical transfer function derived from previously measured steady state data. This transfer function does not account for transient phenomena such as transport delays, sensor dynamics, and most importantly turbine heat soak, which refers to the amount of energy required to bring the turbine to a steady state operational temperature. Therefore, the estimated CRT used for gas turbine control does not accurately reflect the state of the gas turbine system transiently, such as during loading and unloading. During these transient events, the calculated CRT can differ substantially from the true CRT, resulting in unreliable operation and even a shutdown of the gas turbine.

Thus, there is a need to accurately determine the CRT for the purposes of gas turbine control and reliable operation and a need for systems and methods for modifying the performance of a gas turbine.

BRIEF DESCRIPTION OF THE INVENTION

Certain embodiments of the invention can address some or all of the needs described above. Certain embodiments of the invention are directed to systems and methods for modifying the operation and/or performance of a gas turbine. According to one embodiment, a method for modifying the performance of a gas turbine comprising one or more combustors can be provided. The method can begin by measuring a gas exhaust temperature for the gas turbine. In addition, the method can continue by estimating a transient heat transfer rate for the gas turbine based at least in part on the gas exhaust temperature. The method can proceed by controlling the one or more combustors of the gas turbine based at least in part on the estimated transient heat transfer rate.

According to another embodiment of the invention, a system for modifying the performance of a gas turbine comprising one or more combustors can be provided. The system can include at least one sensor for measuring a gas exhaust temperature for the gas turbine. In addition, the system can include a controller operable to receive the gas exhaust temperature from the at least one sensor. Moreover, the controller can be operable to estimate a transient heat transfer rate for the gas turbine based at least in part on the gas exhaust temperature. Furthermore, the controller can be operable to control the one or more combustors based at least in part on the estimated transient heat transfer rate for the gas turbine.

According to yet another embodiment of the invention, a gas turbine system can be provided. The gas turbine system can include at least one gas turbine comprising at least one compressor, one or more combustors, a turbine, and an exhaust port. In addition, the gas turbine system can include at least one sensor connected to the exhaust port. What is more, the system can include a controller operable to receive the gas exhaust temperature from the at least one sensor. Moreover, the controller can be operable to estimate a transient heat transfer rate for the gas turbine based at least in part on the gas exhaust temperature. Furthermore, the controller can be operable to control the one or more combustors based at least in part on the estimated transient heat transfer rate for the gas turbine.

Other embodiments and aspects of the invention will become apparent from the following description taken in conjunction with the following drawings.

BRIEF DESCRIPTION OF THE DRAWINGS

Figure 1:
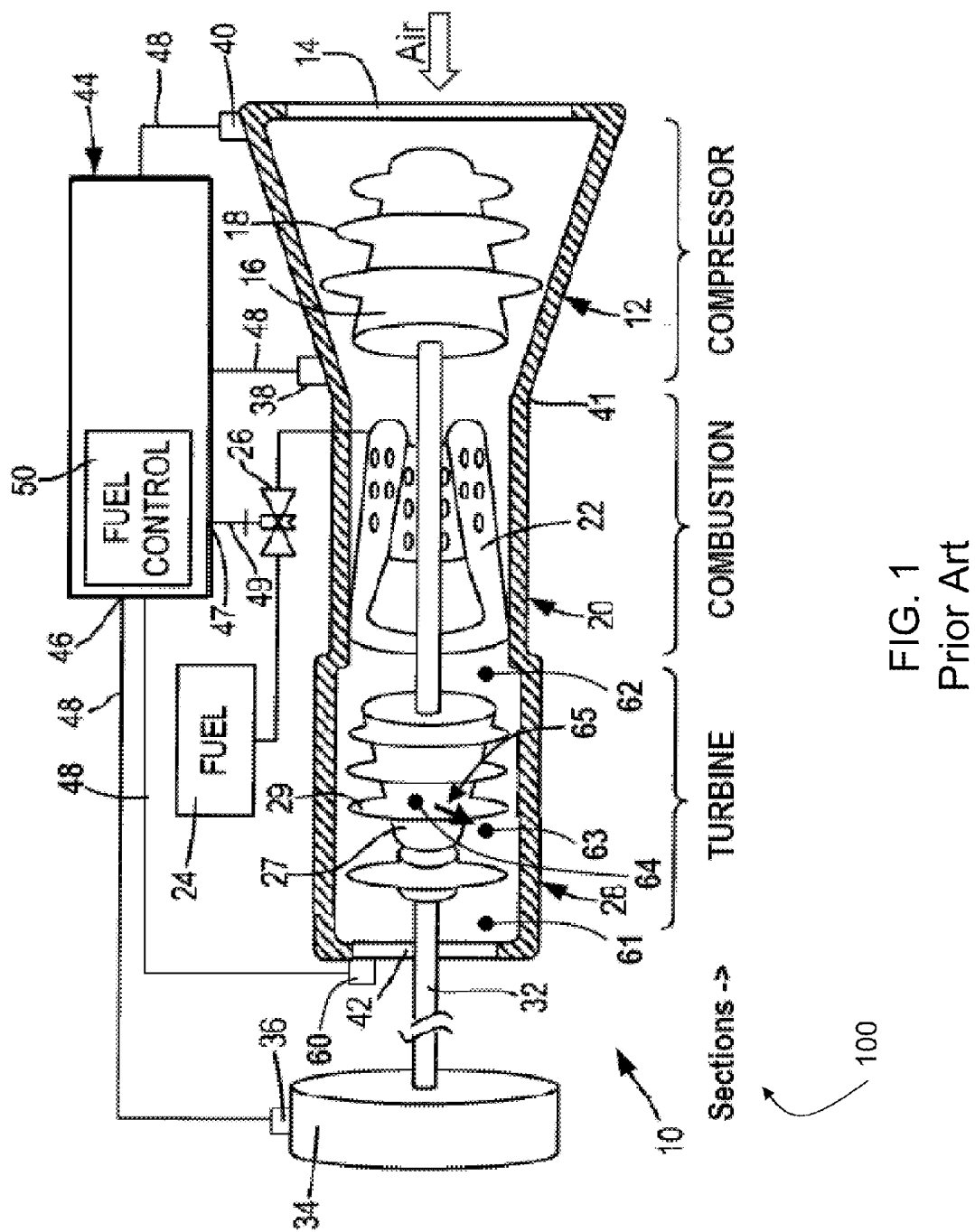

Having thus described the invention in general terms, reference will now be made to the accompanying drawings, which are not necessarily drawn to scale, and wherein:

FIG. 1 illustrates a conventional gas turbine system.

Figure 2:
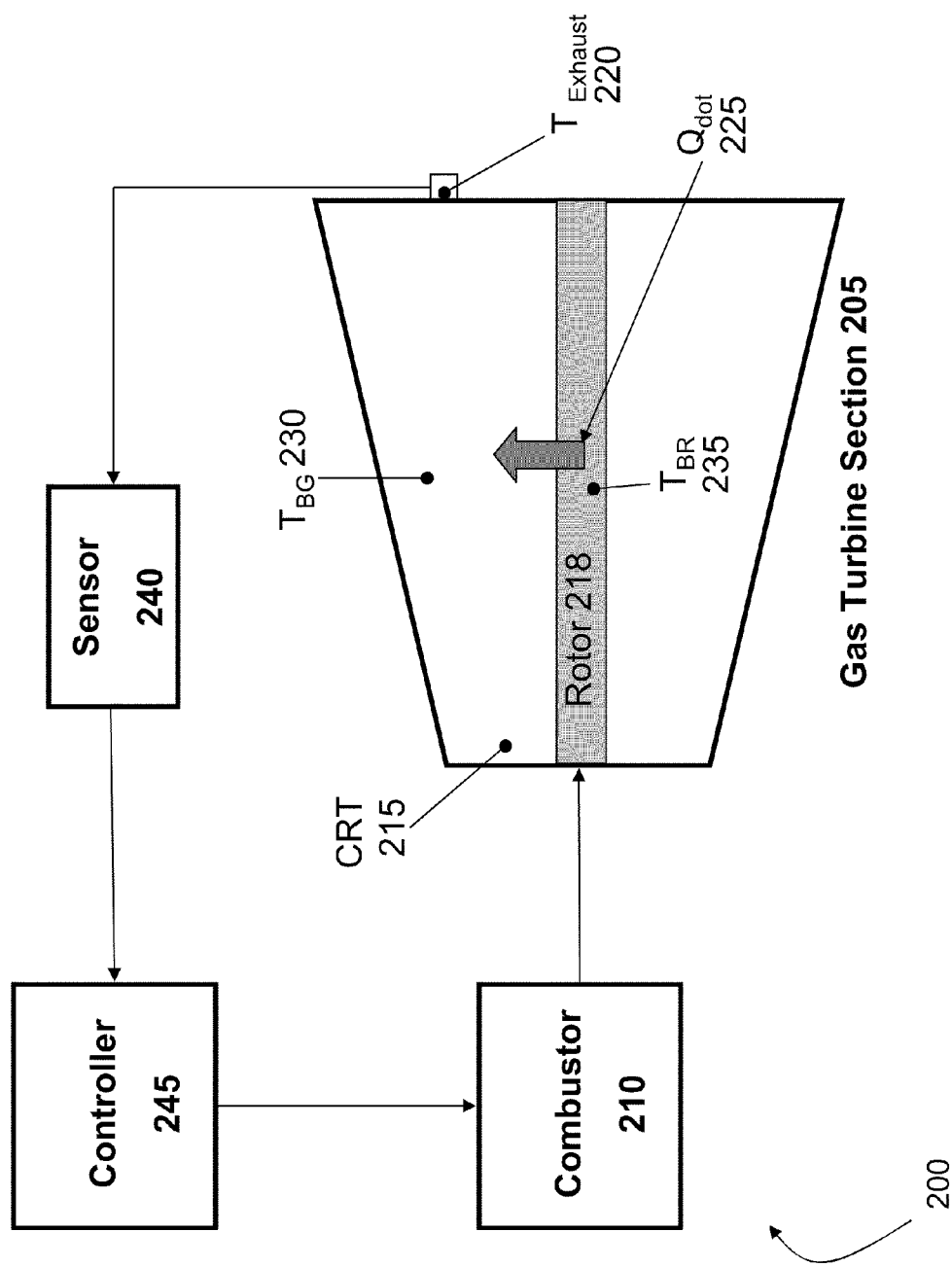

FIG. 2 illustrates an exemplary gas turbine system according to one embodiment of the invention.

Figure 3:
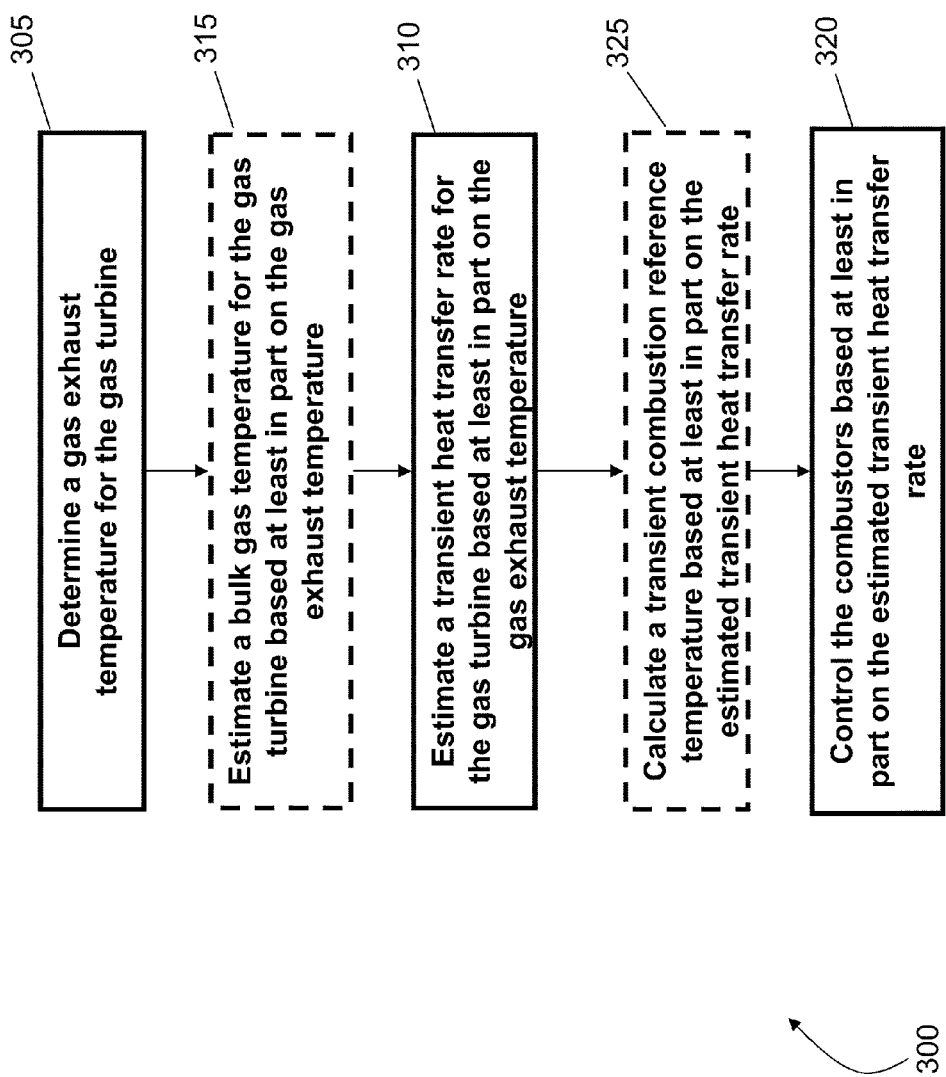

FIG. 3 illustrates an exemplary method for modifying the performance of a gas turbine according to one embodiment of the invention.

Figure 4:
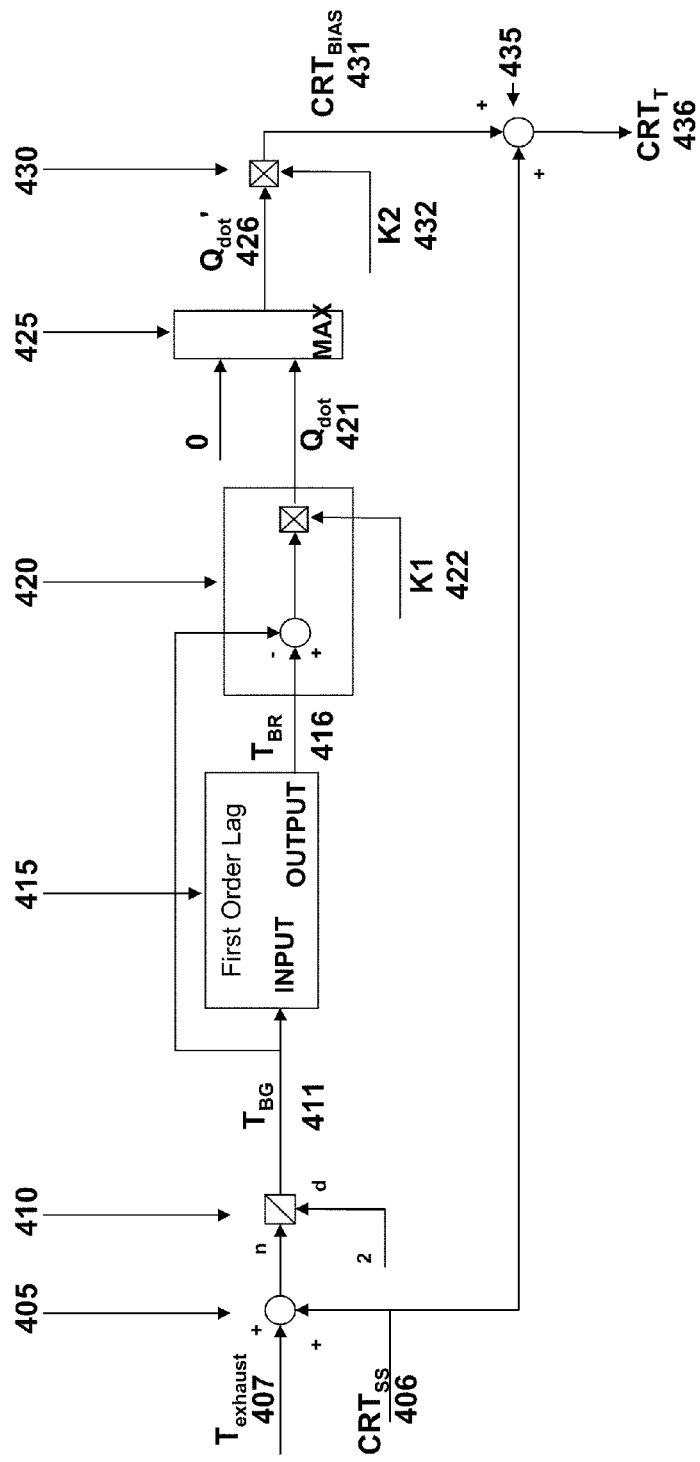

FIG. 4 illustrates an exemplary method for modifying the performance of a gas turbine according to another embodiment of the invention.

Figure 5:
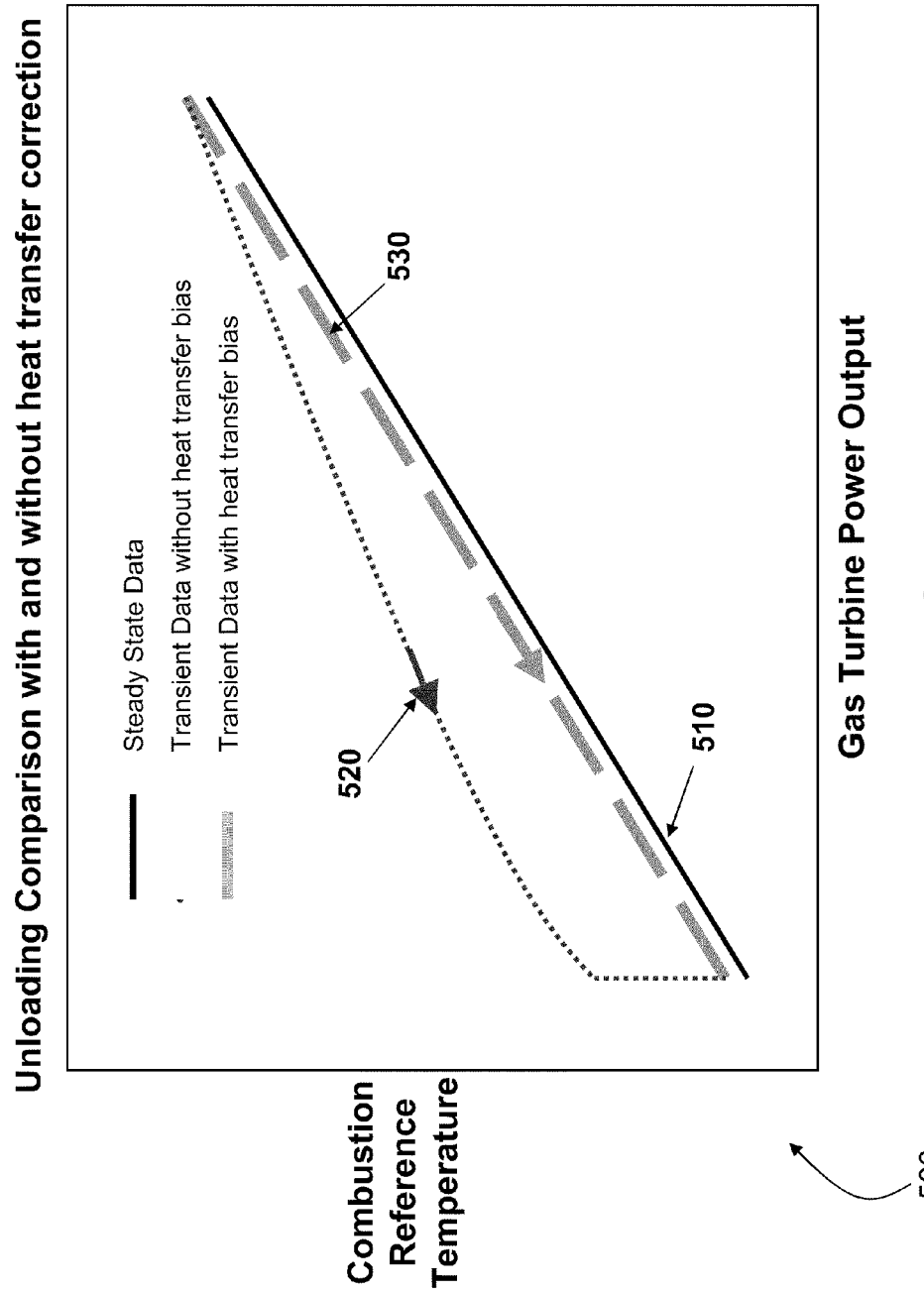

FIG. 5 illustrates a performance characteristic of an exemplary system and method for modifying the performance of a gas turbine according to embodiments of the invention.

DETAILED DESCRIPTION OF THE INVENTION

The invention now will be described more fully hereinafter with reference to the accompanying drawings, in which example embodiments of the invention are shown. This invention may, however, be embodied in many different forms and should not be construed as limited to the example embodiments set forth herein; rather, these embodiments are provided so that this disclosure will convey the scope of the invention to those skilled in the art. Like numbers refer to like elements throughout.

Gas turbine engines are air breathing engines that produce work based on the Brayton thermodynamic cycle and can be used as a power source to drive electrical generating equipment (such as in an electrical power station), for propulsion (e.g., for aircraft, marine vessels, or military equipment such as tanks), or for other uses (e.g., mechanical drive systems). More specifically, in a gas turbine engine, thermal energy can be drawn from the combustion of fuel with air, the combustion of fuel with an oxidizer, chemical reactions and/or heat exchange with a thermal source. This thermal energy is then converted into useful work and can be output in the form of thrust, shaft power, or electricity.

The performance or operation of gas turbine engines is controlled through the use of actuators. Some non-limiting examples of actuators in gas turbine engines include fuel metering valves, inlet guide vanes, variable stator vanes, variable geometry, bleed valves, starter valves, clearance control valves, inlet bleed heat, variable exhaust ports, and the like. Some non-limiting examples of sensed engine values include temperatures, pressures, rotor speeds, actuator positions, and/or flows. Control of the power generated by the gas turbine is typically exercised through control of fuel flow and air flow into the combustor.

With reference to FIG. 1, a combustion type gas turbine system 100 has a gas path which includes, in a serial-flow relationship, an air intake (or inlet) 14, a compressor 12, a combustor 20, a turbine 28, and an exhaust port 42. In gas turbine system 100, control module 44 is primarily responsible for controlling performance and operation. For example, control module 44 contains a fuel control module 50 for controlling the amount of fuel 24 supplied to combustor 20 through control valve 26. At the same time, control module 44 controls inlet vanes at air inlet 14, thereby controlling the amount of air flowing to combustor 20. In doing so, control module 44 can control both the fuel flow and the air flow into combustor 20.

Various other actuators in system 100 can also be controlled through actuation inputs to control module 44. Similarly, various sensors, like exhaust temperature sensor 60, can provide measured or sensed values of parameters for monitoring and use by one or more control systems. To obtain desired fuel economy, to establish and maintain a desired power output, and to reduce the level of emissions in gas turbine system 100, and thereby to maintain efficient operation, requires that a number of critical turbine operating parameters be determined so that optimal fuel flow, distribution, and intake air flow can be maintained. Non-limiting examples of such parameters include: exhaust gas temperature 61, which represents the temperature of the hot combustion gases at exhaust port 42; bulk gas temperature 63, which represents the mass average temperature of the bulk turbine gases in the turbine; and bulk turbine rotor temperature 64, which represents the temperature of the turbine's rotor components.

Another turbine operating parameter that can be determined and can be used for gas turbine control according to certain embodiments of the invention is the combustion reference temperature ("CRT") 62. The CRT 62 is related to the gas temperature at the discharge of the combustor and the inlet of the turbine section. In certain instances, the CRT 62 can be used to schedule the combustor fuel flow supply circuits and hence used to control the division of fuel going to various parts of the combustor.

FIG. 2 illustrates an exemplary system 200 for modifying the performance of gas turbine 205 according to one embodiment of the invention. It should be appreciated that while the systems and methods described herein reference only a single gas turbine, according to other embodiments of the invention, systems using multiple gas turbines can also be adapted to employ the systems and methods disclosed herein. In system 200, gas turbine 205 has a serial flowing gas path that can include an air intake, a compressor, a combustor 210, a turbine rotor 218, and a gas outlet (or exhaust port). As the air-fuel mixture is ignited in gas turbine 205 to produce hot combustion gases and as the thermal energy in these hot combustion gases is converted for useful work, the air temperature at various points along this serially flowing path can differ. For example, CRT 215, representing the gas temperature at the output of the combustor and the inlet of the turbine, can be much hotter than the air temperature at the exhaust port of gas turbine 205, which is represented as $T_{Exhaust}$ 220. When gas turbine 205 is at steady state, this difference in temperatures relates to the amount of thermal energy being converted for useful work.

When gas turbine 205 is in a transient state, though, this difference in temperature between the transient CRT 215 and $T_{Exhaust}$ 220 represents more than just energy conversion. In addition to the amount of thermal energy being converted for useful work, the difference in temperature between the transient CRT 215 and $T_{Exhaust}$ 220 is due in part to the amount of thermal energy being transferred between the bulk exhaust gases within the gas turbine and the turbine's rotor components 218. This heat transfer occurs in transient states because the temperatures of the hot exhaust gases in the turbine section differ from the temperature of the turbine's rotor components 218. As a result, during a transient period, heat is transferred from the hot exhaust gases in the turbine to the turbine's rotor components 218, or vice versa, until at steady state, an equilibrium point is reached. In system 100, this transient heat transfer characteristic within the gas turbine is represented at 65, and in system 200, the transient heat transfer characteristic within the gas turbine section 205 is represented as $Q_{dot}$ 225. Also in system 200, the mass average temperature of the bulk turbine gases is represented as $T_{BG}$ 230; and the temperature of the bulk rotor components 218 is represented as $T_{BR}$ 235.

System 200 also includes sensor 240 and controller 245, which can be adapted to modify the performance of gas turbine 205. Sensor 240, for example, can be adapted to measure the gas temperature at the exhaust port of gas turbine 205, $T_{Exhaust}$ 220. Sensor 240 can be any sensor, transducer, or probe operable to detect, obtain, or monitor the gas temperature $T_{Exhaust}$ 220. For example, sensor 240 may be a thermistor-based probe having a resistance that varies with the exhaust temperature of gas turbine 205. Sensor 240 can communicate the temperature-based signal corresponding to this resistance to controller 245 and can be in electrical communication with controller 245 for this purpose. While sensor 240 is illustrated as a single temperature sensor in system 200, it should be appreciated that this is an exemplary embodiment. Exhaust temperature need not be measured directly, but can be determined or estimated using inputs from other sensors within the gas turbine. Thus, other types of sensor 240, in addition to embodiments of one or more temperature sensors, can be used in accordance with embodiments of the invention.

Controller 245, meanwhile, can be adapted to receive the signal, whether it be a direct measurement or an estimate derived from other sensorial inputs, corresponding to $T_{Exhaust}$ 220 from sensor 240 and to use this signal to modify the performance of gas turbine 205. Controller 245 can be implemented using hardware, software, or a combination thereof for performing the functions described herein. By way of example, controller 245 can be a processor, an ASIC, a comparator, a differential module, or other hardware means. Controller 245 can also comprise software or other computer-executable instructions that may be stored in a memory and may be executable by a processor or other processing means.

Controller 245 can be associated with one or more of the valves and actuators used for control of gas turbine 205, of which those described above in relation to system 100 are examples. Controller 245 can be operable to generate command signals for control of one or more components within gas turbine 205. The command signals generated by controller 245 can cause actuators on the turbine to, for example, adjust valves between the fuel supply and combustors that regulate the flow, fuel splits, and type of fuel flowing to the combustors; adjust inlet guide vanes on the compressor; adjust inlet bleed heat; as well as activate other control settings on gas turbine 205.

To determine the appropriate command signal, controller 240 can be adapted to perform exemplary method 300 illustrated in FIG. 3, which is described more fully below. Controller 245 can be located remotely with respect to gas turbine 205 and sensor 240. Controller 245 can also be co-located or even integrated with gas turbine 205 and sensor 240. Adapting controller 245 to perform embodiments of the exemplary methods described below can include adapting controller 245 with software, hardware, firmware, or any combination thereof. It should be appreciated that multiple controllers 245 can be used, whereby different features described herein may be executed on one or more different controllers 245. However, for simplicity, controller 245 will be referred to as a single component, though it is appreciated that it may be more than one computer processor and/or more than one software application directed to different functions.

FIG. 3 illustrates an exemplary method 300 by which an embodiment of the invention may operate. Provided is a flowchart illustrating an example method for modifying the operation and/or performance of a gas turbine, such as gas turbine 205 in system 200, which can be implemented, at least partially, by a control system with one or more controllers like controller 245.

The method 300 begins at block 305 where a gas exhaust temperature for the gas turbine is determined. In exemplary system 200, this determination can be through direct measurement taken by sensor 240 and provided to controller 245. In addition to direct measurement, a number of other embodiments exist for determining the gas exhaust temperature for the gas turbine. For example, any number of temperature sensors can be used and their measurements averaged to determine the gas exhaust temperature. In other embodiments, gas exhaust temperature can be determined from other parameters, and need not be determined according to measurements of the gas exhaust. These embodiments are known within the art.

Once the gas exhaust temperature for the gas turbine is determined, exemplary method 300 continues at block 310 where the transient heat transfer rate, such as $Q_{dot}$ 225 in system 200, can be determined based at least in part on the gas exhaust temperature. A number of embodiments may exist for estimating the transient heat transfer rate for the gas turbine based at least in part on the gas exhaust temperature. One embodiment, for example, can include block 315 where a bulk gas temperature for the gas turbine is estimated based at least in part on the gas exhaust temperature. In this exemplary embodiment, the transient heat transfer rate for the gas turbine can be estimated based at least in part, in addition to the gas exhaust temperature, on the bulk gas temperature and bulk rotor temperature.

FIG. 4 illustrates exemplary method 400 for estimating a transiently accurate combustion reference temperature based at least in part on the transient heat transfer rate for the gas turbine. This transient heat transfer rate is based at least in part on the gas exhaust temperature, the bulk gas temperature, and the bulk rotor temperature. At block 405, the measured gas exhaust temperature of the gas turbine, $T_{Exhaust}$ 407, can be summed with the steady state combustion reference temperature, $CRT_{ss}$ 406. The sum of these two temperatures can then be averaged at block 410 to estimate $T_{BG}$ 411. $CRT_{ss}$ 406 can be an empirically based calculation derived from steady state measurements taken, for example, during field operation. In the alternative, $CRT_{ss}$ 406 can be estimated according to other methods known within the art, such as using mathematical modeling techniques that may or may not be empirically based. $CRT_{ss}$ 406 can also be estimated or determined from a combination of other inputs and measurements recorded during system operation.

$T_{BG}$ 411 can represent an estimate of the thermal energy present within the gas turbine exhaust gases. $T_{Exhaust}$ 407 and $CRT_{ss}$ 406 serve as initial parameters for determining $T_{BG}$ 411. $CRT_{ss}$ 406, existing at the inlet of the turbine, can represent thermal energy at the inlet of the turbine; $T_{Exhaust}$ 407, existing at the output of the turbine, can represent thermal energy at the output of the turbine section. By averaging $CRT_{ss}$ 406 and $T_{Exhaust}$ 407, a mean estimate of the thermal energy within the gas turbine exhaust gases can be provided. Alternatively, there may be other methods or transfer functions that could be used to estimate the bulk gas temperature, $T_{BG}$ 411, based at least partially on $T_{Exhaust}$ 407 and $CRT_{ss}$ 406. Alternatively, other means may be applied to determine $T_{BG}$ 411 that do not require the use of one or the other or both of $T_{Exhaust}$ 407 and $CRT_{ss}$ 406, but rather using different measured or estimated parameters, including the use of a direct measurement approach.

In exemplary method 400, once the bulk gas temperature in the gas turbine is estimated, the temperature of the turbine's rotor components, or bulk rotor temperature $T_{BR}$ 416, can be determined. This estimate of $T_{BR}$ 416 can be determined empirically using field, laboratory, or real-time measurements, determined by mathematical modeling techniques, determined by a combination of the two, or even defined as a function of one or more of the estimates and measurements above. Such a function can be defined because the transient heat transfer rate for the gas turbine can relate to the bulk gas temperature within the turbine and the temperature of the turbine's rotor components. More specifically, when a gas turbine is operating in a transient mode, heat can be transferred from the bulk gas within the turbine to the turbine's rotor components and vice versa, depending on which is at a higher transient temperature. Thus, the temperature of the turbine's rotor components can be estimated as a function of the turbine's bulk gas temperature.

In exemplary method 400, $T_{BR}$ 416 is estimated as a function of the bulk gas temperature $T_{BG}$ 411. For example, using field measurement data and based on empirical knowledge of the heat transfer characteristic between the bulk gas and the turbine's rotor components during transient operation, a transfer function can be defined and applied to the bulk gas temperature to estimate the bulk rotor temperature. This transfer function can be, but is not limited to, a first or second order lag function. This transfer function can represent a second adjustment factor and can correspond to a system thermal time constant reflecting, for example, the thermal heating or cooling response of the turbine's bulk rotor metal to a different temperature bulk rotor gas. At block 415, this transfer function is applied to $T_{BG}$ 411 to estimate $T_{BR}$ 416. Alternatively, the turbine bulk rotor temperature, $T_{BR}$ 416, may be measured directly.

At block 420, the transient heat transfer rate for the gas turbine, $Q_{dot}$ 421, can be estimated using the bulk gas temperature $T_{BG}$ 411 and the bulk rotor temperature $T_{BR}$ 416. Because heat is transferred from the bulk gas within the turbine to the turbine's rotor components and vice versa, the transient heat transfer rate can be defined as a function of a heat transfer coefficient. In the exemplary embodiment, the transient heat transfer rate is estimated as the difference between $T_{BG}$ 411 and $T_{BR}$ 416 multiplied by tuning constant K1 422. Tuning constant K1 422 represents a first adjustment factor, and can be based on a heat transfer rate for the gas turbine, the bulk turbine rotor metal temperature of the gas turbine, and the bulk gas temperature of the gas turbine. Given this relationship, K1 422 can be based on field data, modeling data, or both, and can represent variations that may exist in a gas turbine's transient heat transfer rate but that may not be reflected in the measurements and calculations above. K1 422 can be a constant value and stored in memory or determined according to a schedule derived from other performance characteristics of the gas turbine. For example, K1 422 can be based on an actual heat transfer rate or a simulated heat transfer rate as determined using advanced numerical and computational techniques. K1 422 can also be a fixed constant determined through trial and error. In any event, by determining the tuning constant K1 422 and applying K1 422 to the difference of $T_{BG}$ 411 and $T_{BR}$ 416, the transient heat transfer rate $Q_{dot}$ 421 of the gas turbine can be estimated. In doing so, the estimated transient heat transfer rate of the gas turbine will be based at least in part on the gas exhaust temperature, the bulk gas temperature, and the bulk rotor temperature since the latter two parameters are partly determined from the gas exhaust temperature $T_{Exhaust}$ 407.

In an alternative embodiment, heat transfer may be measured directly. In yet other alternative embodiments, other transfer functions can be used requiring the same inputs described above, different inputs than those described above, or a combination of the two.

Referring again to FIG. 3, after estimating the transient heat transfer rate for the gas turbine at block 310, exemplary method 300 continues at block 320 by controlling the gas turbine's combustors based at least in part on the estimated transient heat transfer rate to obtain a desired performance. Because a gas turbine's performance can vary according to the transient heat transfer rate for the gas turbine, the gas turbine's performance can be modified by determining this variance and by compensating accordingly. This compensation can be reflected, for example, in the control of various actuators and valves in the gas turbine, such as those described in relation to system 200 and controller 245.

A number of embodiments may exist for determining, based at least in part on the estimated transient heat transfer rate, how to control the combustors to obtain a desired performance. One embodiment, for example, can include block 325 where a transient combustion reference temperature can be calculated for use in gas turbine control. At block 325, the transient combustion reference temperature can be partly based on the previously estimated transient heat transfer rate.

Referring again to FIG. 4, exemplary method 400 presents one embodiment for calculating a transient combustion reference temperature using an estimated transient heat transfer rate. At block 425, the greater value of $Q_{dot}$ 421 or zero is passed from max block 425 to $Q_{dot}'$ 426. Applying this function to $Q_{dot}$ 421 will only return values of $Q_{dot}$ 421 that are greater than zero; that is, $Q_{dot}'$ 426 will equal $Q_{dot}$ 421 unless $Q_{dot}$ 421 is a negative number. In the exemplary embodiment, when $Q_{dot}$ 421 is estimated to be greater than zero, it indicates a leaner condition exists in the gas turbine than desired.

In the exemplary embodiment, the function at block 425 can be used to determine a transient combustion reference temperature only during those transient states where the gas turbine may be operating in a leaner than intended condition. When a gas turbine is operating in a leaner than intended condition, the risk of combustion blow out and turbine shutdown is increased, which to be avoided can be compensated for In other embodiments, it may be desirable to protect against excess emissions, which are generally worse when a gas turbine is operating in a richer than intended condition. In these embodiments, block 425 can be bypassed, and $Q_{dot}'$ 426 and $Q_{dot}$ 421 will be equal regardless of the value of $Q_{dot}$ 421 in relation to zero.

In alternative embodiments, other functions can be used at block 425 to filter or limit $Q_{dot}$ 421 so that transient biases can be eliminated. These functions and filters can be defined according to other parameters or measurements, and not just $Q_{dot}$ 421. Examples of limiting parameters can include any measured parameter (e.g. exhaust temperature, ambient pressure), any estimated parameter (e.g. $CRT_{ss}$), or any command signal (e.g. fuel flow command, IGV command). Block 425 can also be a transfer function that varies the estimated $Q_{dot}$ 421 according to any measured or estimated parameter.

At block 430, a combustion reference temperature bias, $CRT_{BIAS}$ 431, can be determined as a function of the heat transfer rate $Q_{dot}'$ 426. $CRT_{BIAS}$ 431 can represent a correction term to be applied to $CRT_{ss}$ 406 to account for the heat transfer occurring within the gas turbine during the transient state. In the exemplary embodiment, tuning constant K2 432 can be multiplied to $Q_{dot}'$ 426 to estimate $CRT_{BIAS}$ 431. Tuning constant K2 432 can be based on field data, simulation data, or both, and can represent the adjustment to be applied to the transient heat transfer rate to properly account for the transient condition in $CRT_{ss}$ 406. As a result, once this adjustment is defined and applied to $Q_{dot}'$ 426, $CRT_{BIAS}$ 431 can be determined.

At this point, exemplary method 400 concludes at block 435 where $CRT_{BIAS}$ 431 can be added to $CRT_{ss}$ 406 to estimate a transient combustion reference temperature, $CRT_T$ 436. In other embodiments, other transfer functions can also be used to combine $CRT_{ss}$ 406 and $CRT_{BIAS}$ 431 to estimate the transient combustion reference temperature, $CRT_T$ 436.

Once $CRT_T$ 436 is estimated, it can be used to control the combustors and to modify the performance of the gas turbine. For example, in FIG. 5, performance chart 500 illustrates three performance characteristics of an exemplary gas turbine system, including the performance characteristic of a gas turbine system, such as 200, implementing exemplary method 400. Performance chart 500 displays the combustion reference temperature along the y-axis as a function of gas turbine power output on the x-axis. Measured, steady state values of the combustion reference temperature for various loads are illustrated at 510. At 520, a conventional system's estimation of the transient combustion reference temperature at various loads is illustrated as the system is quickly unloaded. In the conventional system, estimates of the combustion reference temperature are derived from an empirically based transfer function. As performance chart 500 displays, when the load of the gas turbine is rapidly decreased, the conventional system's estimate of the combustion reference temperature can vary significantly from the measured, steady state values. As described above, such wide variations in a control system's estimate of the combustion reference temperature can result in unreliable gas turbine operation.

At 530, however, an exemplary system's estimation of the transient combustion reference temperature employing exemplary method 400 is illustrated. Unlike the conventional system, the exemplary system estimates a combustion reference temperature that is much closer to the measured, steady state values. Hence, the exemplary system, when employed as part of a control system for a gas turbine, can provide a much more reliable performance profile given the exemplary system's ability to more accurately estimate the transient state combustion reference temperature, which is at least one technical effect of the invention. In addition, because the exemplary system relies on a minimal number of inputs, relatively simpler control systems using less computing power can be employed. The ability to use relatively simpler and cheaper designs for more accurate operation is another technical effect of the invention.

Many modifications and other embodiments of the inventions set forth herein will come to mind to one skilled in the art to which these inventions pertain having the benefit of the teachings presented in the foregoing descriptions and the associated drawings. Thus, it will be appreciated by those of ordinary skill in the art that the invention may be embodied in many forms and should not be limited to the embodiments described above. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The claimed invention is:

1. A method for modifying the operation and/or performance of a gas turbine comprising one or more combustors, the method comprising:
   determining a gas exhaust temperature for the gas turbine;
   estimating a transient heat transfer rate for the gas turbine based at least in part on the gas exhaust temperature, wherein estimating the transient heat transfer rate for the gas turbine based at least in part on the gas exhaust temperature comprises:
      estimating a bulk gas temperature for the gas turbine based at least in part on the gas exhaust temperature,
      estimating a bulk turbine rotor metal temperature for the gas turbine, wherein estimating the bulk turbine rotor metal temperature for the gas turbine comprises:
         determining a second adjustment factor based at least in part on the bulk turbine rotor metal temperature for the gas turbine and the bulk gas temperature for the gas turbine, wherein the second adjustment factor comprises a lagging function, and
         estimating the bulk turbine rotor metal temperature based at least in part on the second adjustment factor, and
      calculating the estimated transient heat transfer rate based at least in part on the estimated bulk gas temperature and the estimated bulk turbine rotor metal temperature; and
   controlling the one or more combustors based at least in part on the estimated transient heat transfer rate for the gas turbine.

2. The method of claim 1, wherein estimating a bulk gas temperature for the gas turbine based at least in part on the gas exhaust temperature comprises:
   determining a steady-state combustion reference temperature; and
   estimating the bulk gas temperature based at least in part on the gas exhaust temperature and the steady-state combustion reference temperature.

3. The method of claim 2, wherein estimating the bulk gas temperature based at least in part on the gas exhaust temperature and the steady-state combustion reference temperature comprises at least adding the steady-state combustion reference temperature and the gas exhaust temperature.

4. The method of claim 1, wherein controlling the one or more combustors based at least in part on the estimated transient heat transfer rate for the gas turbine comprises:
   calculating a transient combustion reference temperature based at least in part on the estimated transient heat transfer rate for the gas turbine; and
   adjusting at least one combustion characteristic associated with the one or more combustors based at least in part on the transient combustion reference temperature.

5. The method of claim 4, wherein calculating a transient combustion reference temperature based at least in part on the estimated transient heat transfer rate for the gas turbine comprises:
   determining a steady-state combustion reference temperature for the gas turbine;
   determining a combustion reference temperature bias based at least in part on the estimated transient heat transfer rate; and
   calculating the transient combustion reference temperature based at least in part on the combustion reference temperature bias and the steady-state combustion reference temperature for the gas turbine.

6. The method of claim 5, wherein calculating the transient combustion reference temperature based at least in part on the combustion reference temperature bias comprises subtracting the combustion reference temperature bias from the steady-state combustion reference temperature to obtain the transient combustion reference temperature.

7. The method of claim 1, wherein controlling the one or more combustors based at least in part on the estimated transient heat transfer rate for the gas turbine comprises adjusting the one or more combustors when the estimated transient heat transfer rate indicates a lean combustion condition exists.

8. A system for modifying the operation and/or performance of a gas turbine comprising one or more combustors, the system comprising:
   at least one sensor for determining a gas exhaust temperature for the gas turbine; and
   a controller operable to:
      receive the gas exhaust temperature from the at least one sensor;
      estimate a transient heat transfer rate for the gas turbine based at least in part on the gas exhaust temperature, wherein to estimate a transient heat transfer rate for the gas turbine based at least in part on the gas exhaust temperature, the controller is further operable to:
         estimate a bulk gas temperature for the gas turbine based at least in part on the gas exhaust temperature,
         estimate a bulk turbine rotor metal temperature for the gas turbine, wherein to estimate a bulk turbine rotor metal temperature, the controller is further operable to:
            determine a second adjustment factor based at least in part on the bulk turbine rotor metal temperature for the gas turbine and the bulk gas temperature for the gas turbine wherein the second adjustment factor comprises a lagging function;
            estimate the bulk turbine rotor metal temperature based at least in part on the second adjustment factor,
         calculate the estimated transient heat transfer rate based at least in part on the estimated bulk gas temperature and the estimated bulk turbine rotor metal temperature; and
      control the one or more combustors based at least in part on the estimated transient heat transfer rate for the gas turbine.

9. The system of claim 8 wherein to estimate a bulk gas temperature for the gas turbine, the controller is further operable to:

determine a steady-state combustion reference temperature; and estimate the bulk gas temperature based at least in part on the gas exhaust temperature and the steady-state combustion reference temperature.

10. The system of claim 8, wherein to control the one or more combustors based at least in part on the estimated transient heat transfer rate for the gas turbine, the controller is further operable to:

calculate a transient combustion reference temperature based at least in part on the estimated transient heat transfer rate for the gas turbine; and adjust at least one combustion characteristic associated with the one or more combustors based at least in part on the transient combustion reference temperature.

11. The system of claim 10, further comprising:

at least one sensor operable to determine a steady-state combustion reference temperature for the gas turbine; and wherein to calculate a transient combustion reference temperature based at least in part on the estimated heat transfer rate for the gas turbine, the controller is further operable to:

determine a combustion reference temperature bias based at least in part on the estimated transient heat transfer rate; and calculate the transient combustion reference temperature based at least in part on the combustion reference temperature bias and the steady-state combustion reference temperature for the gas turbine.

12. The system of claim 11, wherein to calculate the transient combustion reference temperature based at least in part on the combustion reference temperature bias, the controller is further operable to subtract the combustion reference temperature bias from the steady-state combustion reference temperature to calculate the transient combustion reference temperature.

13. The system of claim 8, wherein to control the one or more combustors based at least in part on the estimated transient heat transfer rate for the gas turbine, the controller is further operable to:

adjust the one or more combustors when the estimated transient heat transfer rate indicates a lean combustion condition exists.

14. A gas turbine system comprising:

at least one gas turbine comprising at least one compressor, one or more combustors, a turbine, and an exhaust port;

at least one sensor connected to the exhaust port; and at least one controller operable to receive a gas exhaust temperature from the sensor;

estimate a transient heat transfer rate for the gas turbine based at least in part on the gas exhaust temperature, wherein to estimate the transient heat transfer rate for the gas turbine, the controller is further operable to:

estimate a bulk gas temperature for the gas turbine based at least in part on the gas exhaust temperature, estimate a bulk turbine rotor metal temperature for the gas turbine, wherein to estimate the bulk turbine rotor metal temperature, the controller is further operable to:

determine a second adjustment factor based at least in part on the bulk turbine rotor metal temperature for the gas turbine and the bulk gas temperature for the gas turbine wherein the second adjustment factor comprises a lagging function;

estimate the bulk turbine rotor metal temperature based at least in part on the second adjustment factor;

calculate the estimated transient heat transfer rate based at least in part on the estimated bulk gas temperature and the estimated bulk turbine rotor metal temperature; and control the one or more combustors based at least in part on the estimated transient heat transfer rate for the gas turbine.

15. The gas turbine system of claim 14, wherein the controller is further operable to:

adjust the one or more combustors when the estimated transient heat transfer rate indicates a lean combustion condition exists.

* * * * *